(12) United States Patent
Lathrop et al.

(10) Patent No.: US 6,849,967 B2
(45) Date of Patent: Feb. 1, 2005

(54) AUTOMATIC TRANSFER SWITCH FOR MICROTURBINE AND METHOD OF OPERATION

(75) Inventors: Todd M. Lathrop, Freedom, PA (US); Bert Popovich, Carnegie, PA (US); Ronald D. Hartzel, Butler, PA (US); David N. Alchier, Bakerstown, PA (US); Nathan J. Weister, Beaver Falls, PA (US)

(73) Assignee: Eaton Corporation, Cleveland, OH (US)

(*) Notice: Subject to any disclaimer, the term of this patent is extended or adjusted under 35 U.S.C. 154(b) by 166 days.

(21) Appl. No.: 10/126,159

(22) Filed: Apr. 19, 2002

(65) Prior Publication Data

US 2003/0197431 A1 Oct. 23, 2003

(51) Int. Cl.[7] .................................................. H02J 7/00
(52) U.S. Cl. .......................................... 307/64; 307/71
(58) Field of Search .............................. 307/9.1, 44, 48, 307/49, 60, 61, 64 OR, 68, 71, 78, 80, 85, 86

(56) References Cited

U.S. PATENT DOCUMENTS

| | | |
|---|---|---|
| 5,635,772 A | 6/1997 | Lagree et al. |
| 5,638,295 A | 6/1997 | Lagree et al. |
| 5,903,116 A | 5/1999 | Geis et al. |
| 6,031,294 A | 2/2000 | Geis et al. |
| 6,137,191 A | 10/2000 | O'Leary et al. |
| 6,169,334 B1 | 1/2001 | Edelman |
| 6,172,432 B1 | 1/2001 | Schnackenberg et al. |
| 6,281,601 B1 | 8/2001 | Edelman et al. |
| 6,646,360 B2 * | 11/2003 | Brown ........................ 307/43 |

* cited by examiner

Primary Examiner—Jessica Han
(74) Attorney, Agent, or Firm—Martin J. Moran

(57) ABSTRACT

A multi-mode transfer switch selectively operates in a first operating mode in which the utility source alone is connected to the load bus, a second operating mode in which only the microturbine is connected to the load bus, and a third operating mode in which both sources are connected to the load bus in parallel. The microturbine is commanded to operate in a voltage mode when connected alone to the load bus and in a current mode when connected in parallel with the utility source. If the utility source fails while operating in parallel with the microturbine, the utility source is disconnected from the load bus and the microturbine is reconfigured in a voltage mode. The transfer controller sends a wake-up signal to the microturbine upon loss of power for starting and providing power to the load bus.

13 Claims, 9 Drawing Sheets

AUTOMATIC TRANSFER SWITCH FOR MICROTURBINE AND METHOD OF OPERATION

BACKGROUND OF THE INVENTION

1. Field of the Invention

This invention relates to electric power systems in which power to a load bus from a utility source is supplemented by, or should the utility source fail, is replaced by, power from an emergency source. More particularly, it relates to a transfer switch for automatically providing power to a load bus from a utility source and/or a microturbine.

2. Background Information

Facilities having a critical requirement for continuous electric power, such as hospitals, certain plant processes, computer installations, and the like, have a standby power source, often a diesel generator. A transfer switch controls connection of the utility lines and the diesel generator to the facility load buses. In many installations, the transfer switch automatically starts the standby generator and connects it to the load bus upon loss of utility power, and reconnects the utility power to the load bus if utility power is reestablished. Some transfer switches effect an open transition between the power sources, that is, one is disconnected from the load bus before the other is connected. Others provide a closed transition wherein the oncoming source is connected to the load bus before the other is disconnected so that both are connected in parallel during the transition. In the latter case, the voltage of the two sources must be in phase and of the same frequency during the closed transition. This can be accomplished passively by waiting for the two voltages to pass through synchronization before initiating the closed transition. Alternatively, the voltage of the standby source can be actively controlled to force it into synchronization with the utility voltage waveform. This active technique can be used to synchronize the two sources for parallel connection to the load bus over extended periods of time.

A relatively new auxiliary power source is the microturbine such as that described in U.S. Pat. No. 5,903,116. Rectified power produced by a gas turbine-driven generator supplies an inverter that produces a three-phase ac output. For stand alone operation, the microturbine operates in a voltage mode. When used to supplement utility power, it is operated in a current mode wherein the voltage is phase locked to the utility voltage.

To my knowledge, there is no automatic transfer switch that accommodates for the unique operating characteristics of a microturbine so that it may be used as an alternative or a supplement to a utility source.

SUMMARY OF THE INVENTION

The invention is directed to a multi-mode transfer switch for selectively connecting a utility source and a microturbine to a load bus. It includes a utility switch for selectively connecting the utility source to the load bus, an emergency switch for selectively connecting the microturbine to the load bus and a control means for selectively: closing the utility switch only to connect only the utility source to the load bus, closing the emergency switch only to connect only the microturbine to the load bus, and closing both the utility switch and the emergency switch to connect the utility source and the microturbine in parallel to the load bus. The control means commands operation of the microturbine in a voltage mode when only the microturbine is connected to the load bus, and in a current mode when both the utility source and the microturbine are connected to the load bus.

The invention is also directed to a method of energizing a load bus from a utility source and a microturbine comprising the steps of: selectively connecting one of: the utility source only, the microturbine only, and both the utility source and the microturbine in parallel to the load bus, and commanding operation of the microturbine in a voltage mode when only the microturbine is connected to the load bus and in a current mode when both the utility source and the microturbine are connected to the load bus in parallel. The invention is further directed to energizing a load bus from a utility bus and a microturbine bus by operating in a first mode of operation in which the utility source is connected to the load and a microturbine is disconnected from the load, operating in a second operating mode in which the utility source is disconnected from the load and the microturbine is connected to the load and a command is sent to the microturbine to operate in a voltage mode, and operating in a third operating mode in which the utility source and the microturbine are both connected to the load bus in parallel and a command is sent to the microturbine to operate in a current mode.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
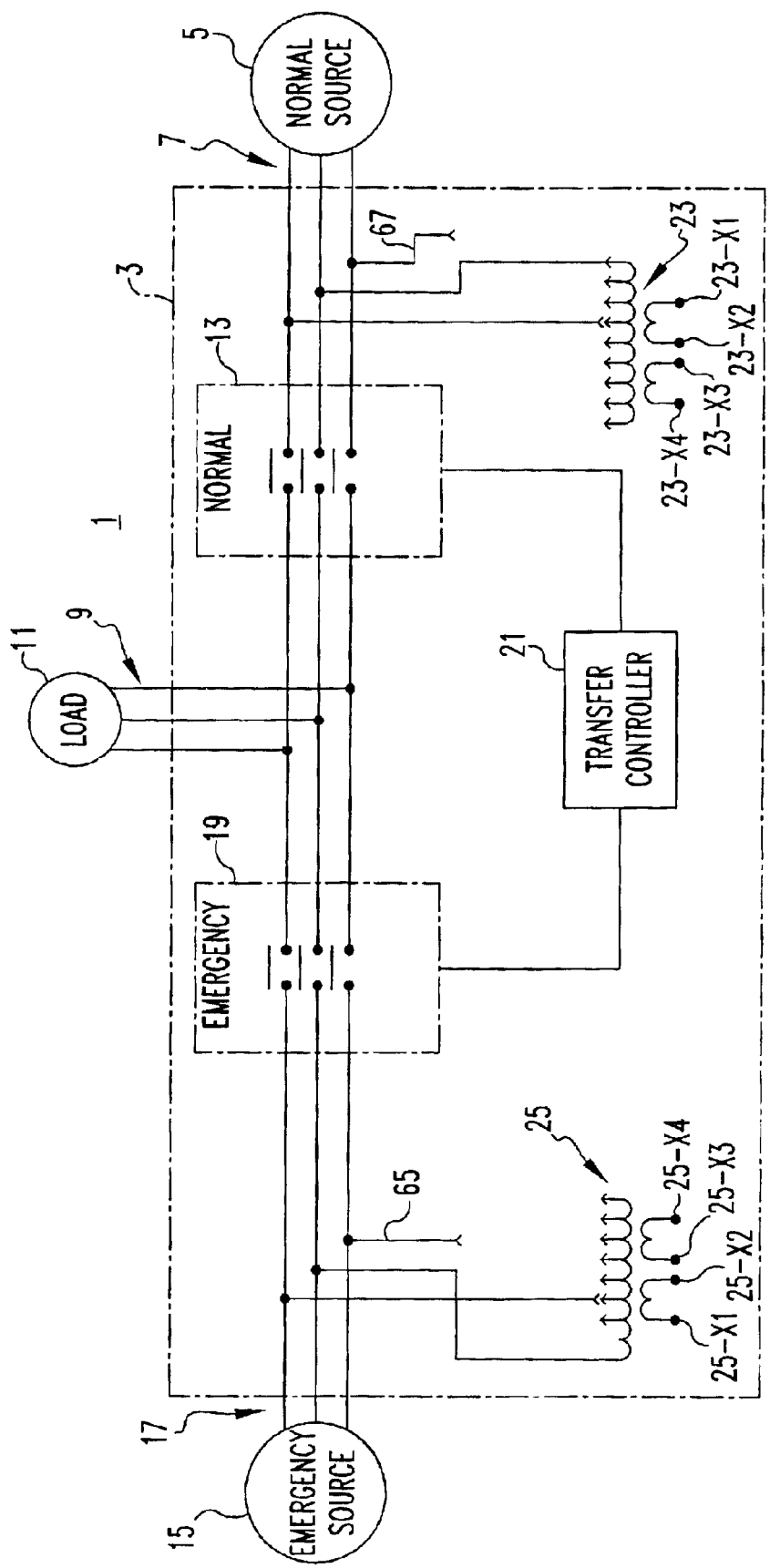
FIG. 1 is a schematic diagram of an electric power system incorporating an automatic transfer switch in accordance with the invention.

FIG. 1 illustrates an electric power system 1 incorporating an automatic transfer switch 3 in accordance with the invention. The electric power system 1 includes a normal or utility power source 5 which provides three-phase power over the utility bus 7 to a load bus 9 having loads 11 through a normal circuit breaker 13. An emergency source 15 can also provide electric power over the three-phase emergency bus 17 to the load 11 on the load bus 9 through an emergency circuit breaker 19. The emergency source 15 is a microturbine such as that described in U.S. Pat. No. 5,903,116. The microturbine 15 incorporates a gas turbine driving a generator providing power to an inverter that produces a three-phase ac output on the emergency bus 17. This microturbine has a start relay which must be actuated to start the turbine. For start-up a battery pack provides electric power that operates the generator as a motor until the gas turbine becomes self-sustaining. In order to conserve battery power, the microturbine goes into a sleep state when not needed. When the microturbine alone is providing power to the load bus, it operates in a voltage mode wherein internal controls of the microturbine maintain proper amplitude and frequency of the power generated. The microturbine can also be connected to the load bus simultaneously with the utility source. In this mode of operation, the microturbine is operated in a current mode and the voltage is phase locked to the utility voltage. Thus, in this mode the current generated by the microturbine is controlled to meet the current demands of the load.

The automatic transfer switch 3 includes a transfer controller 21 which controls the normal switch 13 and the emergency switch 19. These normal and emergency switches 13 and 19 are circuit breakers in the exemplary embodiment that provide protection as well as connection of the normal and emergency sources to the load bus 9. Alternatively, other types of switching devices, including switches without a protection feature, and contactors could be used as the normal switch 13 and the emergency switch 19. As the automatic transfer switch 3 of the invention can parallel the normal and emergency source, the normal circuit breaker 13 is provided with undervoltage protection so that should the normal source fail during parallel operation, the utility bus 7 is disconnected to reduce the load that the emergency source 15 must carry. A normal multi-tap transformer 23 has a primary winding connected for energization by the normal or utility bus 7 and a pair of secondary windings that provide control power to the transfer controller 21. A similar emergency multi-tap transformer 25 can provide control power for the transfer controller 21 from the emergency bus 17.

Figure 2:
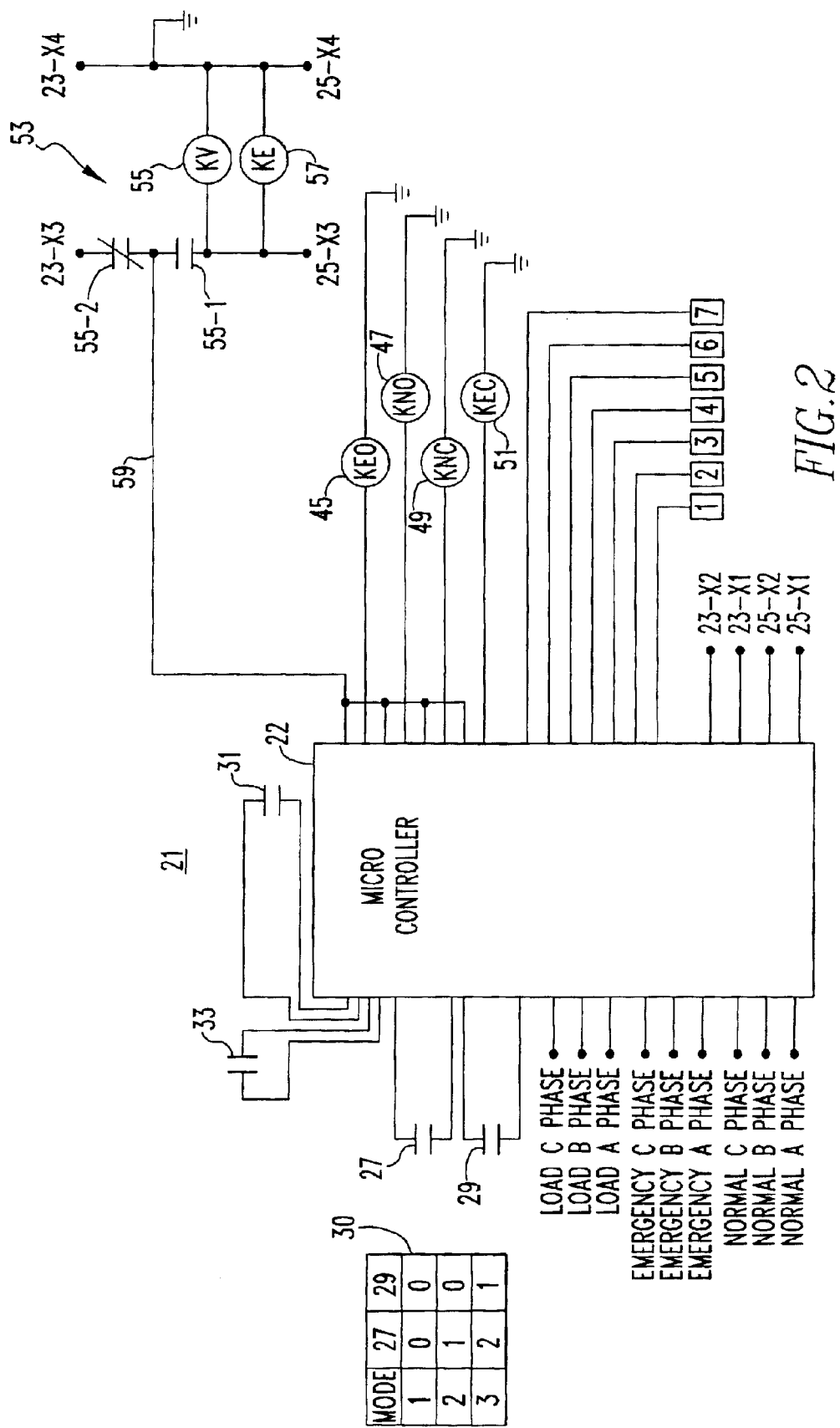
FIG. 2 is a schematic diagram of the transfer controller which forms part of the automatic transfer switch of FIG. 1.
Figure 3A:
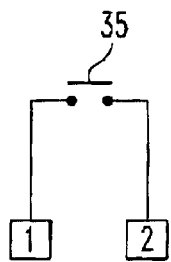
FIG. 3a is a schematic diagram of a circuit generating a start signal for the microturbine.
Figure 3B:
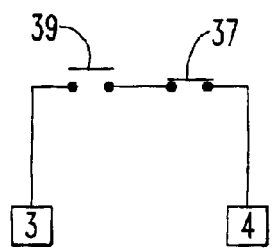
FIG. 3b is a schematic diagram of a circuit generating the wake-up signal for the microturbine.
Figure 3C:
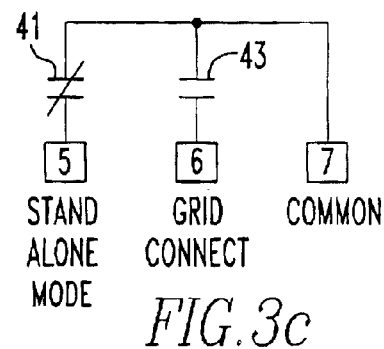
FIG. 3c is a schematic diagram of a circuit generating the mode of operation signal for the microturbine.

A schematic diagram of the transfer controller 21 is illustrated in FIG. 2. This transfer controller 21 has a microcontroller 22 that receives power from either the normal source through the terminals 23-$x$1 and 23-$x$2 of one of the secondary windings of the transformer 23 or from the emergency source, the microturbine, through the first secondary winding of the emergency multi-tap transformer 25 having terminals 25-$x$1 and 25-$x$2. Inputs to the microcontroller 22 include the three-phase voltages from the normal bus 7, the emergency bus 17, and the load bus 9. As will be discussed, the automatic transfer switch 3 can be operated in any of three operating modes: a first mode in which only the utility source 5 is connected to the load bus 9, a second mode in which only the emergency source or microturbine 15 is connected to the load bus, and a third mode in which two sources are connected in parallel to the load bus 9. Selection of the operating mode is made by a pair of switches 27 and 29. The combination of switch positions providing the three modes of operation is shown in the accompanying legend 30. The transfer controller 21 further receives as inputs the open/closed state of the normal and emergency switches 13, 19 as provided by the contacts 31 and 33 of auxiliary switches on the two circuit breakers. If the respective auxiliary switch 31 or 33 is open, the corresponding breaker is open. The transfer controller 21 provides commands to the microturbine through contact closures. For example, closure of the contacts 35 within the microcontroller 22 shown in FIG. 3$a$ provide the engine start command to the microturbine. A battery wake-up command is sent through closure of the normally closed contacts 37 shown in FIG. 3$b$ upon de-energization of a wake-up relay within the microcontroller 22. In series with the wake-up contacts 37 are the normally open contacts 39 of an energy storage type time delay wake-up break (TDWB) relay. When utility power is lost the contacts 39 of the energy storage relay remain closed permitting the wake-up signal to be sent to the microturbine upon de-energization of the wake-up relay. The TDWB relay then times out to terminate the wake-up signal. In addition, the mode of operation is provided to the microturbine through the normally closed stand alone contacts 41 and the normally open grid connect contacts 43, shown in FIG. 3$c$.

Returning to FIG. 2, the transfer controller 21 also provides control signals to the normal or utility circuit breaker 13 and the emergency circuit breaker 19 through energization of an emergency switch open relay (KEO) 45, a normal circuit breaker open relay (KNO) 47, a normal circuit breaker close relay (KNC) 49 and an emergency circuit breaker close relay (KEC) 51. Power to energize these relays is derived from the power circuit 53. A pair of voting relays (KV) and (KE) 55 and 57 provide that if power is available from the microturbine, there must be a need for emergency power, and it is used to power the relays 45, 47, 49 and 51, and associated circuit breaker solenoids (as will be seen). Thus, the relays 55 and 57 are energized by the second, secondary winding of the emergency mutli-tap transformer 25 through the terminals 25-$x$3 and 25-$x$4 when the microturbine is supplying power. With KV relay 55 energized, the contacts 55-1 provide power from the emergency bus through the lead 59 to the microcontroller 22 while the contacts 55-2 disconnect the lead 59 from the second secondary winding of the normal multi-tap transformer 23. When the emergency bus is not energized, the normally closed contacts 55-2 connect the lead 59 to the terminals 23-$x$3 and 23-$x$4 of the normal multi-tap transformer secondary winding. The microcontroller 22 has internal contacts which connect the power provided on the lead 59 to the appropriate relay 45, 47, 49 and 51.

Figure 4:
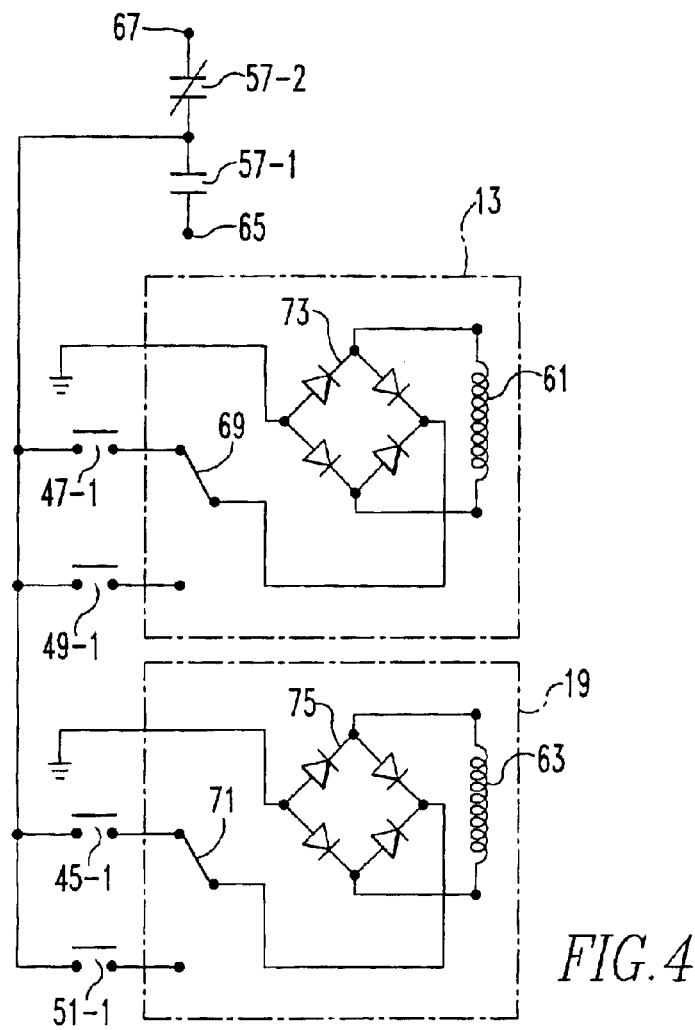
FIG. 4 is a schematic diagram illustrating the trip solenoid circuits for the circuit breaker switches which form part of the automatic transfer switch.

These solenoid relays 45, 47, 49 and 51 are provided as the internal contacts within the microcontroller 22 cannot switch the power needed to operate the circuit breaker solenoids. Thus, as seen in FIG. 4, contacts of these relays are used to control energization of the solenoids 61 and 63 of the normal circuit breaker 13 and emergency circuit breaker 19, respectively. The voting relay KE 57 supplies power for the solenoids at bus voltage through the tap 65 on one of the emergency bus phase conductors when the KE relay 57 is energized to close the contacts 57-1. When the emergency bus is not energized and therefore the KE relay 57 is not energized, the normally closed contacts 57-2 provide solenoid power from the normal bus through the tap 67. Each of the circuit breakers has a handle switch 69, 71 which is positioned by the condition of the switch. FIG. 4 shows switch position with the circuit breakers closed. When the normal switch 13 is to be opened, the microcontroller 22 energizes the KNO relay 47 to close the contacts 47-1. A rectifier bridge circuit 73 converts the ac source current to dc for operating the dc solenoid 61. Opening of the normal switch 13 causes the handle position switch 69 to transfer to the lower position so that when the microcontroller 22 energizes the KNC relay 49, the contacts 49-1 are closed to again energize the solenoid 61 to close the normal switch 13. Reversal of the operating mechanism to open and close the switch is implemented mechanically, as is well known. In a similar manner, the dc solenoid 63 of the emergency switch 19 is energized through the rectifier bridge 75 to open the emergency switch when the microcontroller 22 of the transfer controller 21 energizes the relay KEO 45 to close the contacts 45-1. With the handle switch 71 in the lower position, energization of the KEC relay 51 closes the contacts 51-1 to close the emergency switch 19.

As previously mentioned, the automatic transfer switch 3 of the invention has three operating modes. In the first mode, the utility source is preferred and serves as the primary supply with the microturbine used for back-up/stand-by operation. In the second operating mode, the microturbine is preferred and it serves as the primary supply while the utility is used for back-up/stand-by operation. In the third operating mode, the utility source and microturbine operate in parallel with either becoming the sole source if the other fails. When the microturbine alone is providing the power, it is operated in a voltage mode. However, when used in parallel with the utility, the microturbine is operated in a current mode and its voltage is phase locked to the utility voltage.

Figure 5:
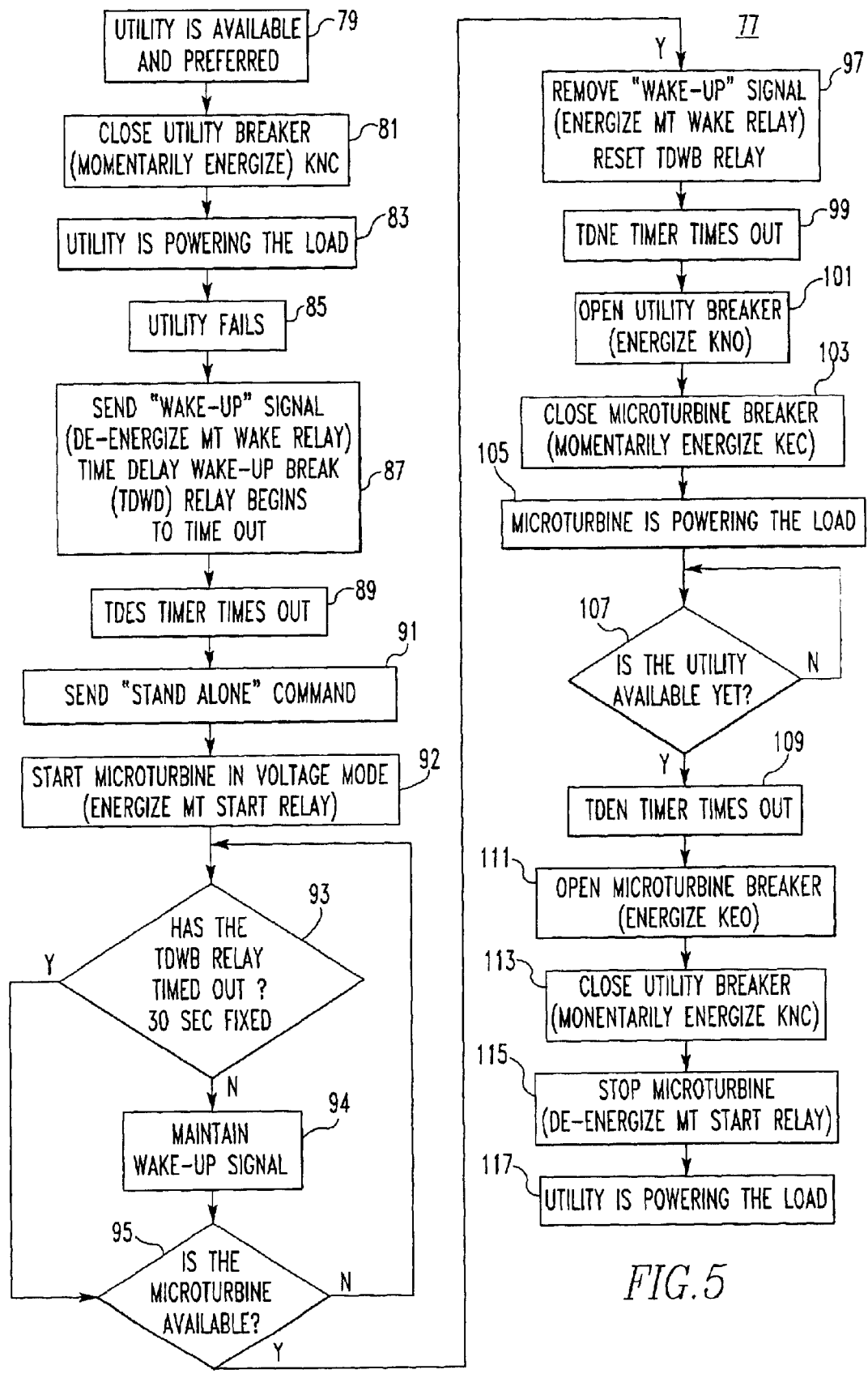
FIG. 5 is a flow chart of a first mode of operation of the automatic transfer switch in which the utility source is preferred.

The first or mode 1 operation is illustrated in the flow chart 77 of FIG. 5. When mode 1 is selected at 79 by opening both of the mode switches 27, 29, the utility or normal breaker 13 is closed at 81 through energization of the KNC relay 49 and the utility powers the load at 83. Should the utility source fail at 85, the undervoltage release mechanism opens the utility breaker. A "wake-up" signal is sent to the microturbine at 87 by deenergizing the wake-up relay and the TDWB relay begins to time out. This activates the battery pack on the microturbine. When the emergency start timer has timed out at 89, the microcontroller 22 sends the "stand alone" command to the microturbine at 91. This starts the microturbine in the voltage mode at 92. The maximum duration for the wake-up signal is 30 seconds as set by the TDWB timer at 93. Until this timer times out, the wake-up signal is maintained at 94 and until the microturbine becomes available at 95, the timing loop is maintained. If the TDWB timer times out in 30 seconds at 93 and the microturbine is still off, it requires service. Otherwise, when the microturbine becomes available at 95, either before or after expiration of the 30 second timing period, the "wake-up" signal is removed at 97. When the normal to emergency time delay timer has timed out at 99 after a period sufficient to allow the utility to recover if it can, the utility breaker is opened at 101 by energizing the KNO relay 47 and the microturbine or emergency breaker 19 is closed by momentarily energizing the KEC relay 51 at 103.

At this point, the microturbine is powering the load as indicated at 105. However, if the utility again becomes available at 107, and remains a stable source for an interval determined by an emergency to normal time delay at 109, the microturbine or emergency breaker 19 is opened at 111 by energizing the KEO relay 45. The utility breaker 13 is then closed at 113 by momentarily energizing the KNC relay 49 and the microturbine is shut down at 115 so that the utility is again powering the load at 117.

Figure 6:
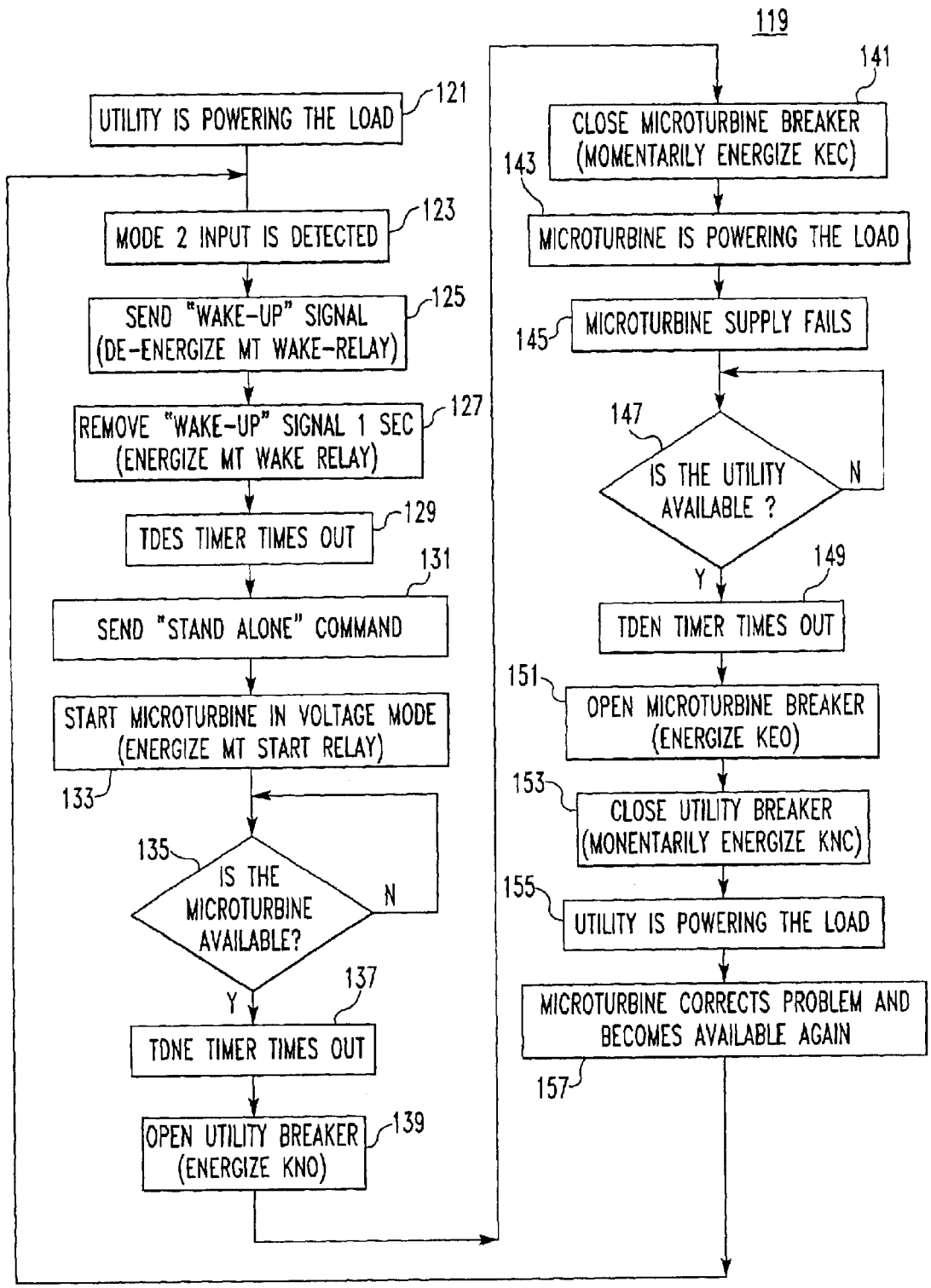
FIG. 6 is a flow chart of a second mode of operation of the transfer switch in which the microturbine operation is preferred.

FIG. 6 illustrates the flow chart 119 for operation in the second mode in which the microturbine is preferred. As normally the utility is the preferred source, it is assumed here that the system is operating in mode 1 with the utility powering the load at 121. When the mode 2 input through closure of the switch 27 while the switch 29 remains open is detected at 123, the "wake-up" signal is sent to the microturbine at 125. This signal is discontinued at 127 after one second and when the emergency start timer times out at 129 the "stand alone" command is sent to the microturbine at 131. This starts the microturbine in the voltage mode at 133 and when its operation is stabilized at 135 and remains stable for the duration of the normal to emergency time delay at 137, the utility breaker 13 is opened at 139 by energization of the KNO relay 47 and closure of the microturbine or emergency breaker by momentarily energizing the KEC relay 51 at 141. The microturbine is now powering the load at 143. However, should the microturbine fail at 145 and the utility source is detected as being available at 147 and has remained available for the emergency to normal time delay at 149, the microturbine or emergency breaker is opened at 151 by energizing the KEO relay 45. The utility breaker 13 is then closed at 153 by momentarily energizing the KNC relay 49 at 153 so that the utility is powering the load at 155. If the microturbine corrects its problem and again becomes available at 157 and mode 2 operation is still commanded at 123, this procedure is repeated to transfer back to the microturbine.

The parallel operation of mode 3 is illustrated in the flow chart 159 of FIGS. 7a–7d. With the utility powering the load in mode 1 at 161, the call for mode 3 operation is detected at 163 through closure of the contacts 27 and 29. Upon confirmation at 169 that the microturbine is de-energized, a "grid connect" command is sent to the microturbine at 171 and the microturbine, emergency breaker 19 is closed at 173 by momentarily energizing the KEC relay 51 at 175 to parallel both sources. The microturbine is started in the current mode at 175 and the sources are paralleled at 177. The emergency breaker 19 is closed at the same time the grid connect signal is given. This back feeds the utility voltage source to the microturbine. This signal is what allows the microturbine to "phase lock" with the utility. Once the microturbine deems itself good, it will close its internal contactor to parallel the microturbine output with the utility through the transfer switch.

If during mode 3 operation, mode 1 operation is commanded as detected at 179, the microturbine is stopped at 181 and its circuit breaker 19 is opened at 183 by energizing the KEO relay 45. The microcontroller 22 then removes the "grid connect" command and sends a "stand alone" command to the microturbine at 185 and the utility alone is powering the load at 187.

Figure 7A:
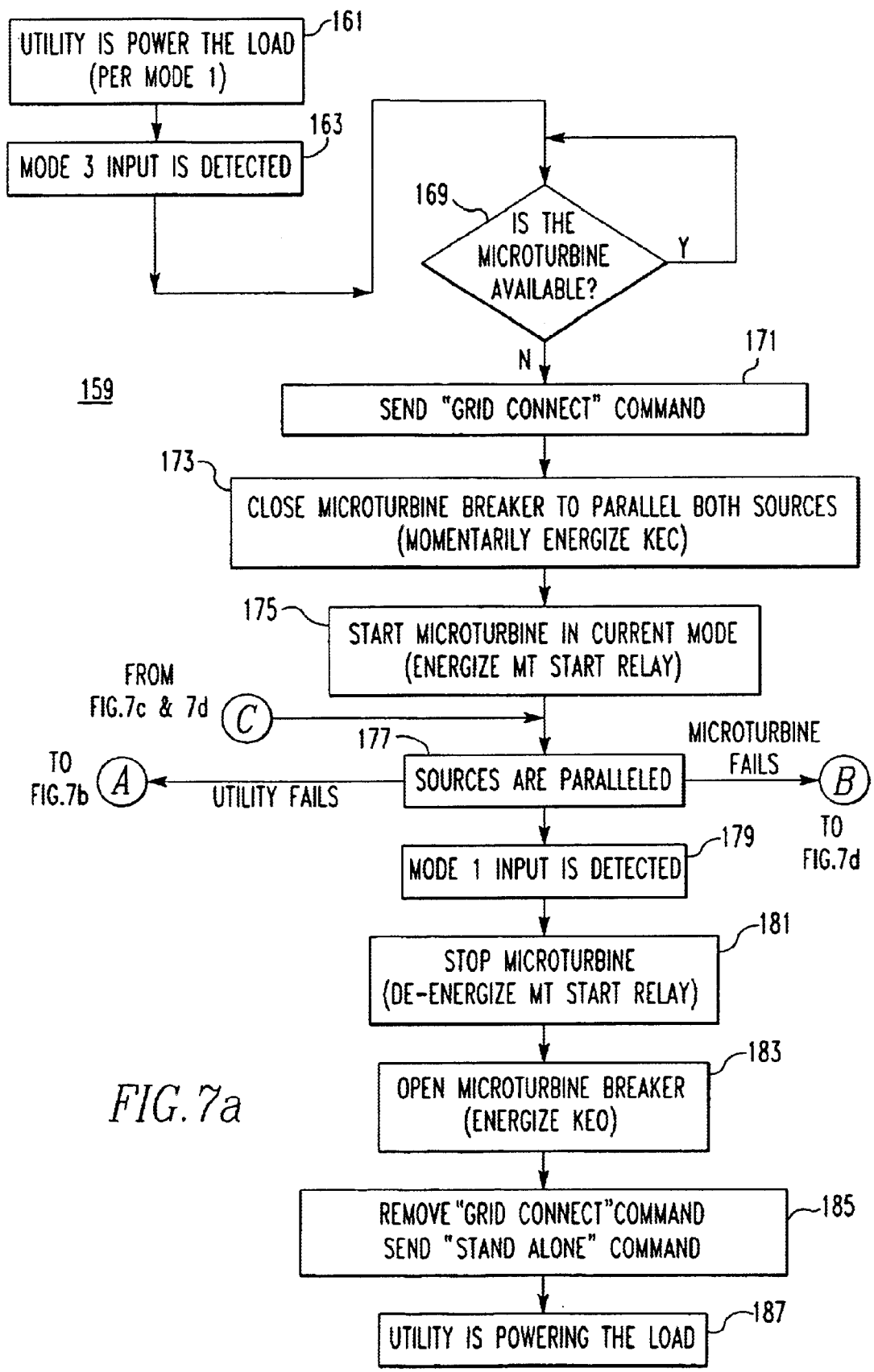
FIGS. 7a–7d illustrate a flow chart of a third mode of operation of the automatic transfer switch in which parallel operation of the utility source and the microturbine is preferred.
Figure 7B:
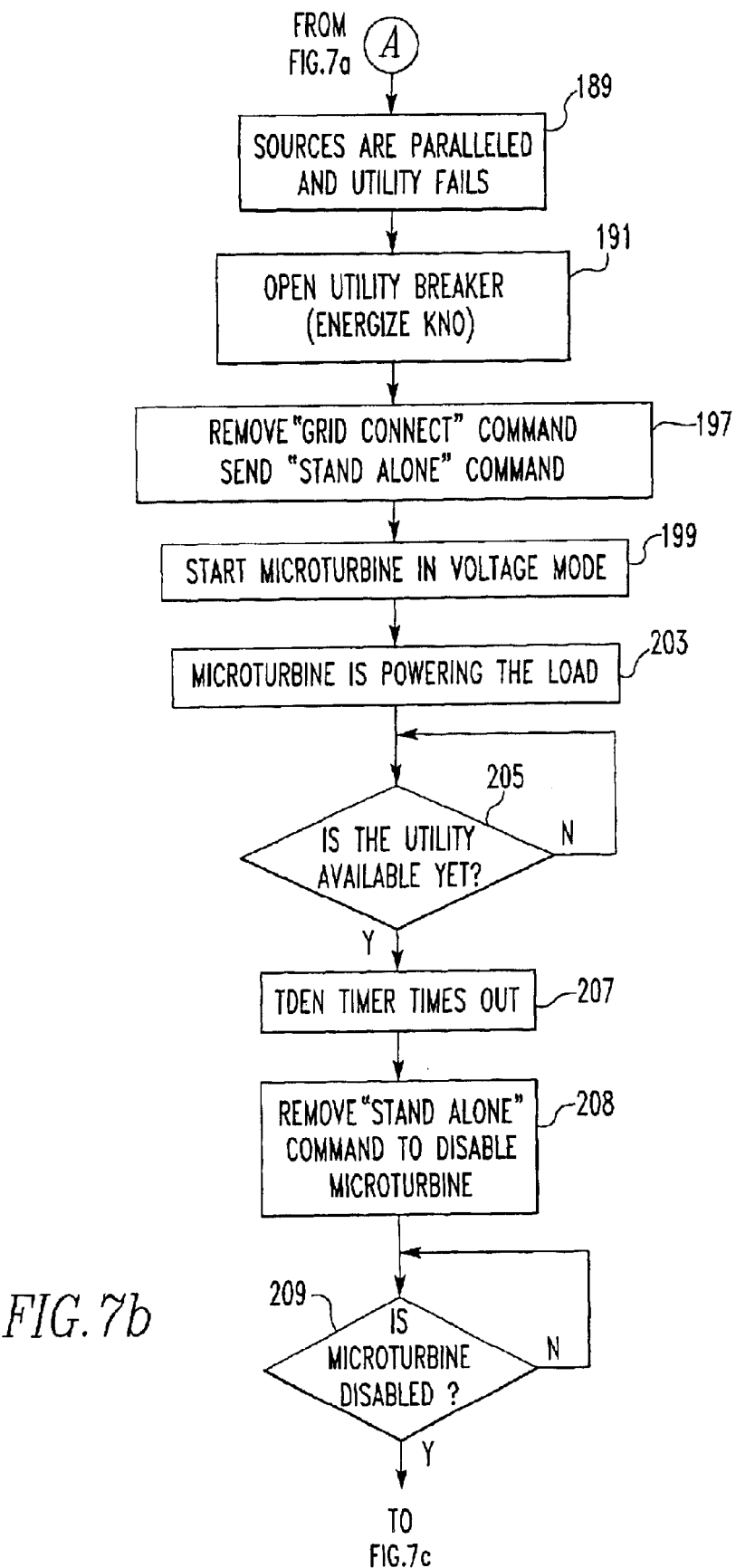
Figure 7C:
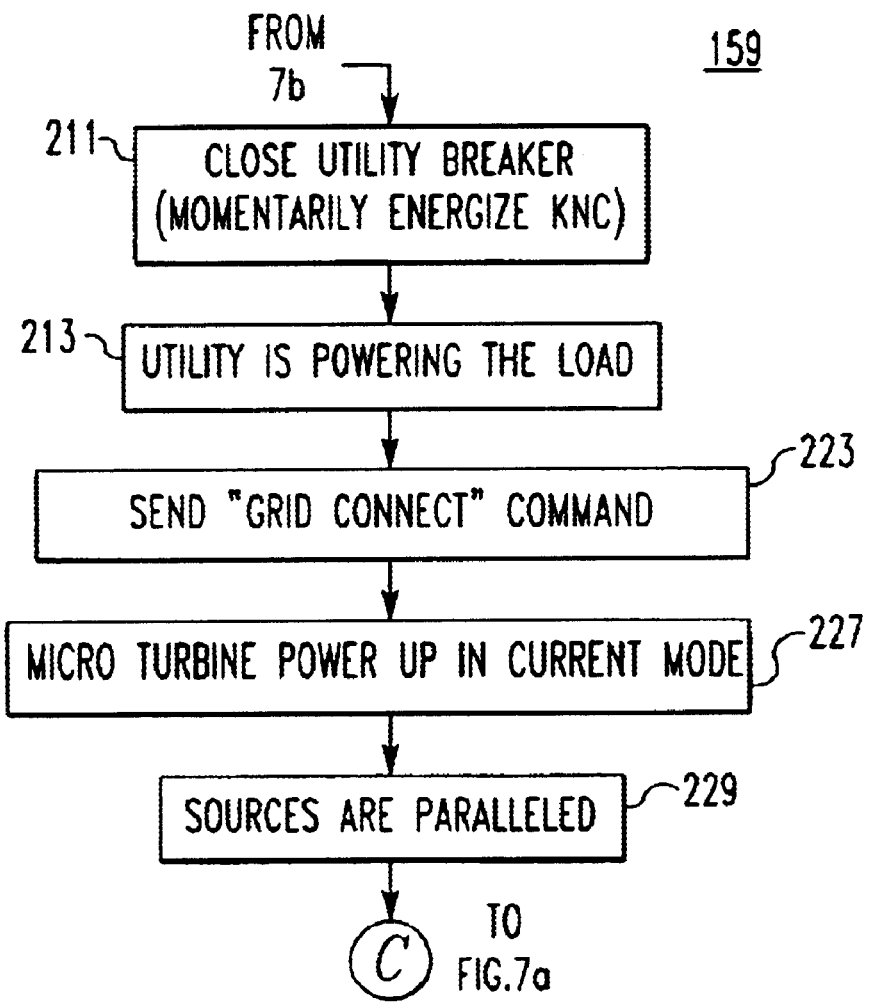

If during parallel operation, the utility source should fail, control is transferred to the branch of the routine 159 illustrated in FIGS. 7b and 7c. When the sources are paralleled and the utility fails at 189, the utility breaker 13 is opened by the undervoltage release mechanism. This separates the utility from the load. The loss of the utility causes the microturbine to open its internal contactor. This separates the microturbine from the load. The microturbine is reconfigured to the voltage mode at 199 by removing the "grid connect" command and sending the "stand alone" command at 197. The microturbine alone is then powering the load at 203. The microcontroller 22 monitors the voltage on the utility bus, and if the utility source again becomes available at 205 and remains stable for a selected interval at 207, the microturbine is disabled by removing the "stand alone" command at 208 and closing the utility breaker 13 at 211 by momentarily energizing the KNC relay 49 so that for the moment the utility alone is powering the load at 213. The "grid connect" command is sent at 223 and the microturbine re-enabled in the current mode at 227 so that the sources are again paralleled at 229.

The above sequences for parallel operation of the microturbine with the utility apply when the microturbine can be reconfigured between the voltage and current modes of operation without shutdown. Earlier microturbine controls require such a shutdown. Thus, in FIG. 7b, when the utility fails, the microturbine breaker 19 is opened with the utility breaker at 191, the microturbine is stopped, restarted in the voltage mode by the "stand alone" command at 197, and then the microturbine (emergency) breaker 19 is reclosed so that the microturbine only powers the load at 203. Similarly, the microturbine is disconnected from the load, restarted in the current mode by the "grid connect" command at 223 before being reconnected to the load to operate in parallel with the utility after the utility comes back on-line.

Figure 7D:
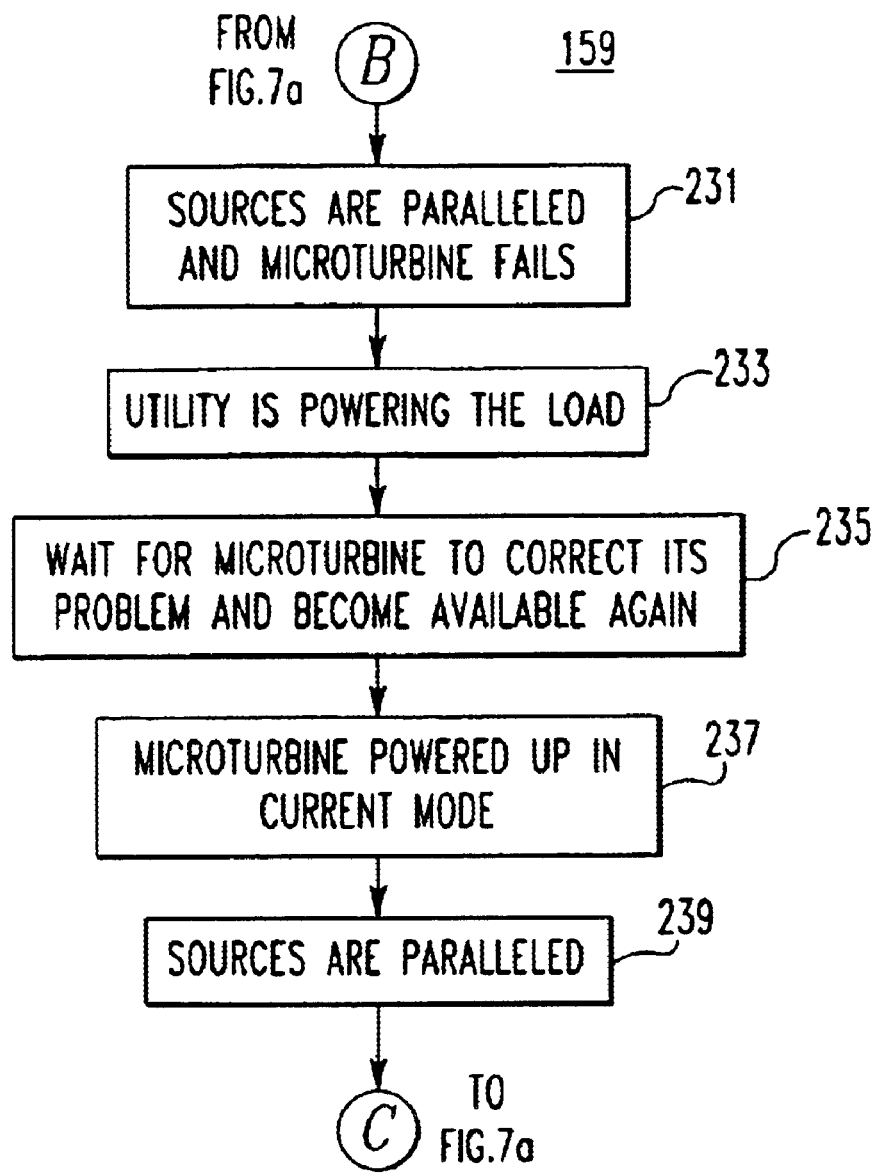

Should the microturbine fail during parallel operation, control is transferred from block 177 in FIG. 7a to the branch of the routine 159 shown in FIG. 7d. When the microturbine fails at 231, the utility is powering the load at 233. If the microturbine again becomes available at 235, it is started in the current mode at 237 and the sources are again paralleled at 239.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A multi-mode transfer switch for selectively connecting a utility source and a microturbine to a load bus, the multi-mode transfer switch comprising:

a utility switch for selectively connecting the utility source to the load bus;

an emergency switch for selectively connecting the microturbine to the load bus; and control means for selectively: closing the utility switch only to connect only the utility source to the load bus, closing the emergency switch only to connect only the microturbine to the load bus, and closing both the utility switch and the emergency switch to connect the utility source and the microturbine in parallel to the load bus, and commanding operation of the microturbine in a voltage mode when only the microturbine is connected to the load bus and in a current mode when both the utility source and the microturbine are connected to the load bus.

2. The multi-mode transfer switch of claim 1, wherein the control means comprises a transfer controller comprising:

first mode operating means for operating in a first mode in which the utility switch is closed to connect the utility source to the load bus and the emergency switch is opened to disconnect the microturbine from the load bus;

second mode operating means for operating in a second mode in which the utility switch is opened to disconnect the utility source from the load bus and the emergency switch is closed to connect the microturbine to the load bus and a command is sent to the microturbine to operate in a voltage mode; and third mode operating means for operating in a third mode in which the utility switch and the emergency switch are both closed to connect both the utility source and the microturbine to the load bus and a command is sent to the microturbine to operate in a current mode.

3. The multi-mode transfer switch of claim 2, wherein the third mode operating means includes means detecting failure of the utility source and means responsive thereto to open the utility switch, and means to command the microturbine to power up in the voltage mode.

4. The multi-mode transfer switch of claim 3, wherein the third mode operating means includes means detecting when the utility source again becomes available, means to close the utility switch, means to disable the microturbine, and means to re-enable the microturbine in the current mode.

5. The multi-mode transfer switch of claim 1 adapted for use with a microturbine having a sleep mode wherein the control means includes wake-up means sending a command to the microturbine to exit the sleep mode.

6. A method of energizing a load bus from a utility source and a microturbine comprising the steps of:

selectively connecting one of: the utility source only, the microturbine only, and both the utility source and the microturbine in parallel to the load bus; and commanding operation of the microturbine in a voltage mode when only the microturbine is connected to the load bus and in a current mode when both the utility source and the microturbine are connected to the load bus in parallel.

7. A method of energizing a load bus from a utility source and a microturbine comprising the steps of:

operating in a first operating mode in which the utility source is connected to the load bus and the microturbine is disconnected from the load bus;

operating in a second operating mode in which the utility source is disconnected from the load bus and the microturbine is connected to the load bus and a command is sent to the microturbine to operate in a voltage mode; and operating in a third operating mode in which the utility source and the microturbine are both connected to the load bus in parallel and a command is sent to the microturbine to operate in a current mode.

8. The method of claim 7, wherein operating in the third operating mode includes detecting failure of the utility source, and in response thereto, disconnecting the utility source and the microturbine from the load bus, stopping the microturbine, restarting the microturbine in the voltage mode, and reconnecting the microturbine to the load bus.

9. The method of claim 8, wherein operating in the third operating mode further includes monitoring the utility source for resumed operation, and in response thereto disconnecting the microturbine from the load bus, reconnecting the utility source to the load bus, stopping the microturbine, starting the microturbine in the current mode, and reconnecting the microturbine to the load bus.

10. The method of claim 9, wherein starting the microturbine in the current mode includes using the utility voltage as a voltage reference for the microturbine voltage.

11. The method of claim 7, wherein the microturbine has a sleep mode when not in use and operation in the second operating mode includes sending a command to the microturbine to wake up out of the sleep mode for starting the microturbine.

12. The method of claim 7, wherein operating in the third operating mode includes detecting failure of the utility source, and in response thereto, disconnecting the utility source from the load bus, disabling the microturbine, and re-enabling the microturbine in the voltage mode.

13. The method of claim 12, wherein operating in the third operating mode further includes monitoring the utility source for resumed operation, and in response thereto, reconnecting the utility source to the load bus, disabling the microturbine, and re-enabling the microturbine in the current mode.

* * * * *